July 4, 1950
P. SPORN ET AL
2,513,373
HEAT PUMP SYSTEM
Filed Sept. 20, 1947
3 Sheets—Sheet 2
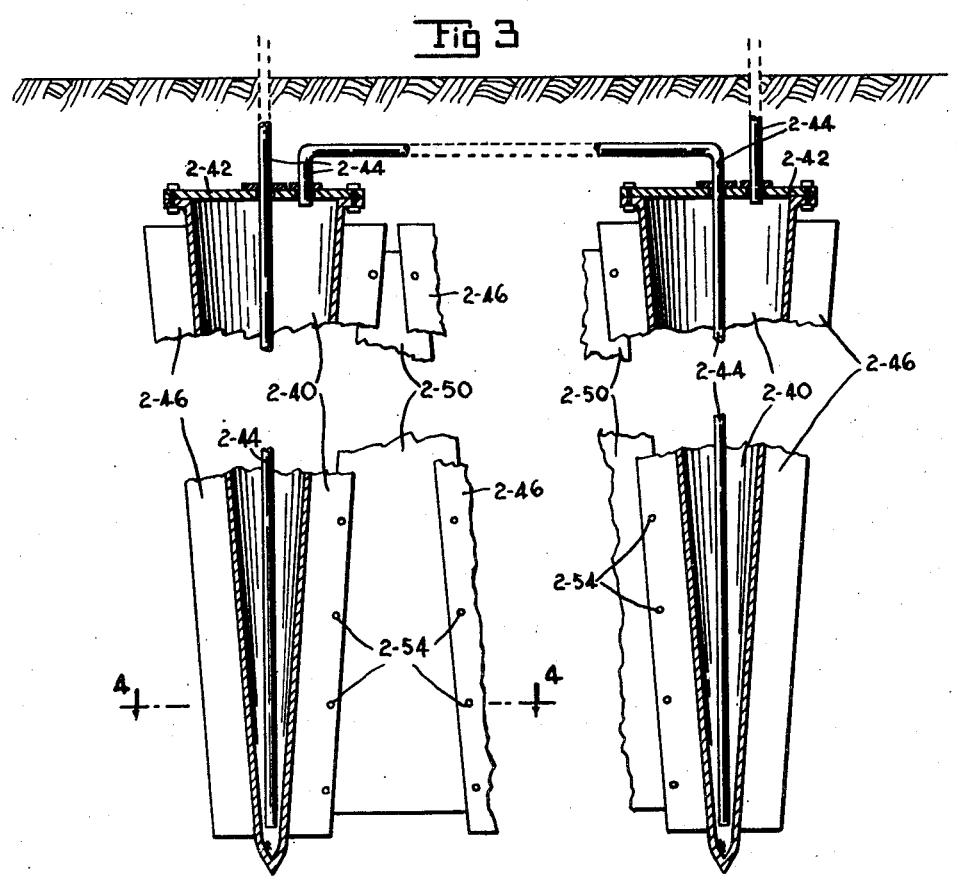
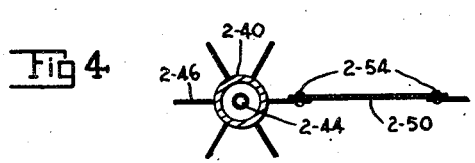
INVENTORS
P. SPORN
E. R. AMBROSE
BY
ATTORNEY

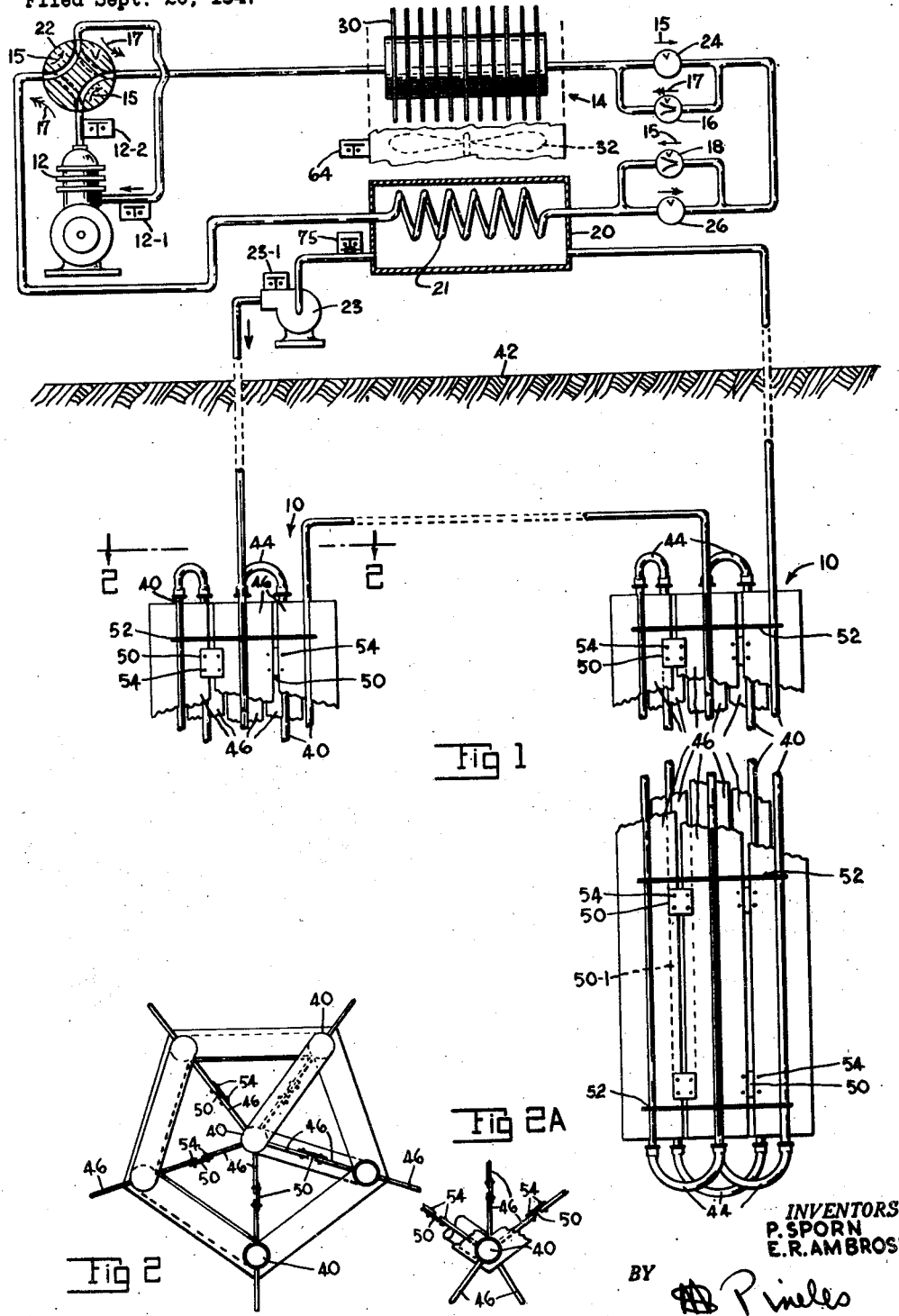

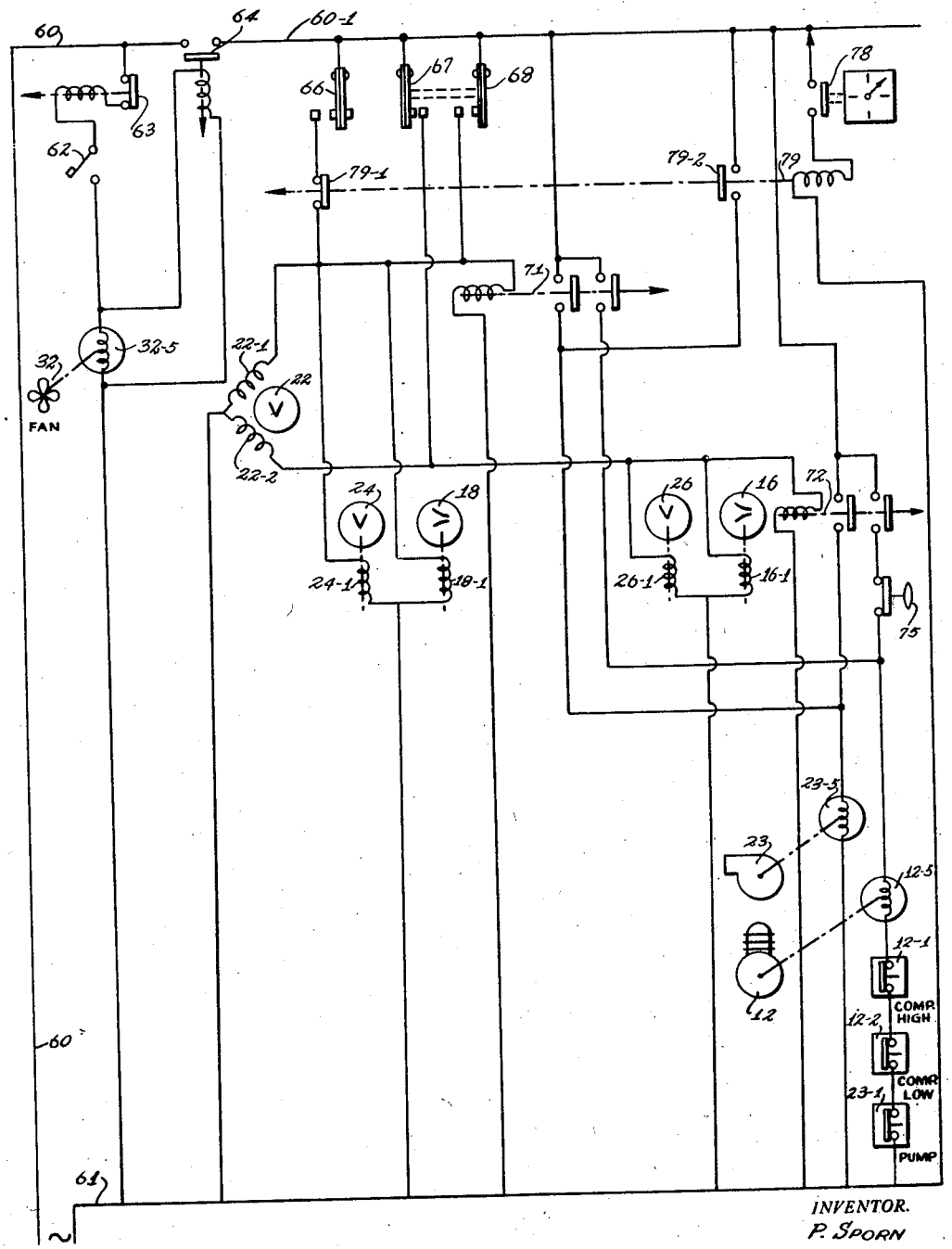

Patented July 4, 1950

2,513,373

UNITED STATES PATENT OFFICE 2,513,373

HEAT PUMP SYSTEM

Philip Sporn and Eugene Russell Ambrose, New York, N. Y., assignors to American Gas and Electric Company, New York, N. Y., a corporation of New York Application September 20, 1947, Serial No. 775,280

11 Claims. (Cl. 62—129)

This invention relates to novel heat pump systems for heating and cooling.

The principal features of the heat pump are well known and center about a combination of compressor, condenser, expansion valve and evaporator. The combination is used in the conventional refrigerating cycle by passing a gaseous refrigerant through the compressor where its temperature is elevated, rejecting heat from the compressed refrigerant in the condenser where it is liquified, reducing the pressure on the liquified refrigerant by moving it through the expansion valve and permitting it to evaporate in the evaporator where its temperature is reduced and it absorbs heat. When used for heating, a given space or object to be heated is placed in heat exchange relation with the condenser to utilize the heat there rejected during the liquification of the refrigerant. When used for cooling the space or object to be cooled is placed in heat exchange relation with the evaporator according to the conventional refrigeration technique.

In either mode of operation, the problem arises as to the supply of heat to the evaporator when heating is desired and the disposal of heat from the condenser when refrigeration is desired.

The use of the earth as a substantially constant-temperature reservoir for heat exchange purposes is also well known, as shown, for example, in the U. S. patent to Hill No. 1,875,305, dated August 30, 1942.

Among the objects of the present invention are novel heat pump systems using ground heat exchangers as a part of the heat pump system.

The foregoing and other objects of the invention will be best understood from the following description of exemplifications thereof, reference being had to the accompanying drawings wherein Fig. 1 is a diagrammatic showing in simplified form of the essential elements of a novel heat pump system according to the invention;

Fig. 2 is a view of a ground heat exchanger of Fig. 1 taken along the line 2—2;

Fig. 2A is a fragmentary view similar to Fig. 2 of a modified form of ground heat exchanger;

Fig. 3 is a sectional view of a different form of ground heat exchanger exemplifying the invention;

Fig. 4 is a sectional view of a part of the ground heat exchanger of Fig. 3, taken along line 4—4; and Fig. 5 is a simplified schematic diagram of one form of an automatic heat pump system of the invention.

In the form shown in Fig. 1, the heat pump system of the invention comprises one or more ground heat exchangers 10, compressor 12, conditioner 14, expansion valves 16, 18 and balancing heat exchanger 20. A fluid refrigerant is arranged to be circulated by the compressor 12 through conditioner 14, expansion valves 16, 18 and balancing heat exchanger 20 under the control of a reversing valve 22 and by-pass valves 24, 26 so that the refrigerant cycle may be reversed to selectively use the conditioner 14 as a condenser and the balancing heat exchanger 20 as an evaporator or vice versa.

The balancing heat exchanger 20 is shown as a vessel arranged to pass a heat exchange fluid recirculating from the ground heat exchanger 10 under the action of an impeller such as pump 23 in effective heat exchange relationship with the refrigerant passing through a tube coil 21 immersed in the fluid moving through the exchange vessel 20.

The conditioner 14 is arranged to pass the materials to be subjected to the desired heating or cooling treatment into effective heat exchange relation with the refrigerant. In the form of the invention shown, a gas, such as the air in a house structure to be air-conditioned is the material to be heated or cooled by moving it as by a fan 32 across the finned surface 30 of the refrigerant carrying conditioner duct structure 14.

The ground exchangers 10 are shown in Fig. 1 as separate assemblies of conduits 40 held together as units for individual handling, imbedded in the ground under the ground surface 42. The conduits are interconnected as by elbow collars 44 so that a suitable heat exchange fluid such as water may be recirculated through the conduits 40 and the balancing heat exchanger 20. The conduits 40 are also provided with outwardly extending sheet-like projections or fins 46. These fins are placed in intimate thermal contact with the conduits 40 as by making them integral parts of the conduit walls by welding or extrusion for example. The fins greatly improve the rate of heat exchange between the earth and the fluid within the conduits by increasing the area of contact between the conduits 40 and the ground.

A feature of the invention is the use of these sheet-like fins 46 to hold together an assembly of conduits 40. This makes it possible to space the individual conduits 40 by a distance sufficient to properly distribute the heat transfer into the ground, at the same time providing a conduit unit 10 which is simple to assemble and to place in operative position. Only a single hole in the earth need be formed to accommodate one of the conduit assemblies 10 and the lattice work of conduits and fins in any assembly makes extremely effective use of the space it occupies. The hole in which it is placed may be of any convenient size and is prepared with existing tools.

As shown in Figs. 1, 2, 2A the conduits 40 are held together by clamping plates 50 secured to the fins 46 as by bolts or rivets 54 or by welding. Another feature of the invention is the generally cylindrical distribution in which the individual conduits of an assembly are held thereby adding to its rigidity and ease of handling. A further feature is the fact that the cylindrical distribution is simplified by the provision of an approximately central conduit 40 the fins of which are so located as to simplify the unification of the assembly.

As more clearly shown in Fig. 2 the fins of the central conduit 40 are arranged so that they are directed to an opposing fin of a surrounding conduit to form a pair that can be readily clamped together as with simple plate-like members. The clamping plates 50 may be provided with slotted bolt receiving apertures to permit simple assembly in the event that some of the fins are warped or misaligned.

If desired the conduit assemblies 10 may be further strengthened by reinforcing members such as the transverse plates 52 extending between conduits and shaped to offer large resistance to radial twisting of the assembly.

The clamping members 50 may be relatively small separated individual plates distributed along the lengths of the fins as shown in full lines, or they may be elongated substantially continuous members extending along considerable portions of the fins as indicated by the dash lines 50—1.

Instead of placing the reenforcing sheets generally horizontal as shown in Fig. 1, they may be tilted so as to permit simpler packing of the earth around the conduits when the earth is filled in on an assembly placed in a hole in the ground.

Fig. 2A shows another modification of the invention in which each of the individual conduits 40 of a ground heat exchanger 10 is provided with a larger number of fins. By this technique, not only are the heat exchange characteristics improved but all the finned conduits may be of substantially identical construction. The entire assembly is accordingly made simpler to produce in quantity.

In use the system of Fig. 1 may be arranged to selectively heat or cool the air to be conditioned. Other features of the heat pump system of the invention shown in Fig. 1 will now be explained in connection with the following description of its operation, first when used to heat air passing through the air conditioner 14, and second when used to cool air passing through the air conditioner 14:

*Heating.*—When the system is used for heating the conditioned air passing through conditioner 14, selector valve 22 is placed in the full line position shown in Fig. 1, by-pass valve 24 is opened, and by-pass valve 26 is kept closed.

In this setting of the system, the compressor 12 is arranged to circulate the refrigerant fluid along the path indicated by the single-head arrows 15, while the pump 23 recirculates the ground heat exchange liquid through the ground heat exchangers 16 and balancing heat exchanger 20.

The compressed vaporized refrigerant fluid, the temperature of which is raised by compression, is delivered to conditioning heat exchanger 30 of the air conditioner 14, the conditioning heat exchanger 30 now operating as a condenser. The fan 32 moves the air to be heated over the fins of the conditioning heat exchanger 30, the flowing air being heated by the latent heat given up by the compressed refrigerant vapor which becomes liquified as it cools in passing through the conditioning heat exchanger 30. The so liquified refrigerant then flows through the open by-pass valve 24 and the open expansion valve 18 into the heat exchange coils 21 of the ground heat exchanger 20, the heat exchange coils 21 being connected to the suction end and the compressor 12.

The drop in pressure maintained by the expansion valve 18 causes the liquified refrigerant passing through the heat exchange coils 21 to evaporate thereby absorbing heat of vaporization from the ground heat exchange liquid passing from the ground duct system 10 to the balancing heat exchanger vessel 12 around the heat exchanger coils 21. After leaving the heat coils 21, which now operate as an evaporator, the vaporized refrigerant fluid has completed a full heating cycle and is back at approximately its original low temperature and pressure at which it enters the suction side of compressor unit 12 for starting another similar air-heating heat-exchange cycle.

These heat-exchange cycles are continuously repeated as long as compressor 10, fan 12, and pump 23 operate in the above heat setting. At the same time the ground heat exchange liquid is circulated by the pump 23 through the ground heat exchanger vessel 20 where it gives up heat to the expanded refrigerant fluid flowing through coil 21, and the evaporated refrigerant absorbs the latent heat of evaporation from the flowing surrounding ground heat exchange liquid. In passing through the ground heat exchanger ducts 10, the cooled ground heat exchange fluid is heated by the ground ducts and carries the absorbed heat to the balancing heat exchanger 20 where it is again absorbed by the evaporated refrigerant passing through the refrigerant heat exchanger coil 21. The large mass of ground adjacent each ground heat exchanger provides a heat reservoir of extremely large capacity which can give up large amounts of heat without too much change of temperature. This maintenance of temperature is assisted by so placing the ground heat exchangers that they are essentially below that crust portion of the earth's surface which exhibits seasonal or diurnal temperature variations.

*Cooling.*—When the system of Fig. 1 is used for cooling the conditioned air passing through the conditioner 14, the selector valve 22 is set, as by turning 90°, to complete the dash-line circulating paths for reversing the direction of the flow of the refrigerant through the serially connected air conditioning heat exchanger 13 and the refrigerant carrying coil 21 of the ground heat exchanger 20, the by-pass valve 24 being closed and the by-pass valve 25 being opened.

With the fan 32 and the ground heat exchange fluid pump 23 operating as before, the compressor 12 will deliver the compressed vaporized refrigerant fluid, the temperature of which is raised by compression, to the heat exchange coils 21 of the ground heat exchanger 12, the coil 21 now operating as a condenser. The ground heat exchange liquid impelled by the pump 23 around the refrigerant carrying coils 21 now operating as a condenser causes the compressed heated refrigerant vapor to give up heat to the surrounding ground exchange liquid which is at a lower temperature, thereby causing liquification of the refrigerant. The liquified refrigerant passes from heat exchanger coils 21 through the open valve 23 and the expansion valve 16 into the conditioning heat exchanger 30 which is connected to the suction end of the compressor 12 and now operates as a condenser.

The drop in pressure maintained by the expansion valve 16 causes the liquid refrigerant passing through the heat exchanger 30 to evaporate therein and the evaporated refrigerant absorbed heat evaporization from the surrounding air moved by the fan 32, thereby cooling the air that has to be conditioned. After leaving the conditioning heat exchanger 30, the vaporized refrigerant fluid has completed a full cooling cycle and is back at approximately its original low temperature and pressure at which it enters the suction side of the compressor 12 for starting another similar air cooling heat exchange cycle, which are continuously repeated while the system remains in operation.

The ground heat exchange liquid which absorbed heat from the heat exchanger coils 21, operating as a condenser, is impelled by the pump 3 successively from the ground heat exchanger vessel 20 to the ground heat exchange ducts 10 where they give up heat to the surrounding ground, the large mass of earth providing for the ready absorption of large quantities of heat without substantial rise of temperature.

As shown above, the large heat reservoir provided by the ground enables simple absorption or liberation of heat for large-scale conditioning operations such as the treatment of air in large office buildings but is also of advantage in small buildings, in locations where electrical energy is available at a low rate. This is a highly advantageous feature of the invention. The use of air as a balancing heat exchange reference is complicated by the large heat exchange surfaces required the freezing of the moisture in the air when absorbing heat from it, with the resultant insulation of the heat exchange surfaces by ice, etc. Additionally air temperatures are highly variable and are invariably higher in the summer when the air is to absorb rejected heat and lower in winter when the air is to supply balancing heat, a factor which makes for lower operating efficiencies.

The direct utilization of waters, such as ground or well waters, as a heat reservoir complicates matters by creating water disposal problems and by the corrosion effects of the circulation of such waters.

In the system of the invention the ground heat exchange fluid may simply be an inexpensive high specific heat liquid such as water although other heat exchangers may be used. The closed circulation path used of the ground heat exchange fluid makes possible the treatment of the water as by chemical inhibitors to practically prevent any corrosion. A small amount of antifreeze may be added to the water to prevent damage by freezing. The efficiency is such that not much ground heat exchange area is required. Thus, for example, a single heat exchanger, such as is illustrated in Fig. 1, may have an overall height of the order of 30 feet and a width of about two feet. The ground unit can be placed in a single hole in the ground. The installation may be placed beneath the building to be air conditioned and should last the life of the building, especially if the conduits are made of copper and copper construction is also desirable because of its high thermal conductivity.

Although the system of Fig. 1 shows series flow of heat exchange fluid through the conduits of one or more ground heat exchangers 10, these conduits may be arranged for parallel flow of ground heat exchange fluid simultaneously through two or more independent circuit paths in heat exchange relationship with the ground. If desired, valved interconnections may be provided to enable shifting from series flow of fluid through the conduits, as shown in Fig. 1, to parallel flow or vice versa.

Figs. 4 and 5 show a modification of a ground heat exchange system of the invention. In this form of the invention individual conduits 2—40, of generally tapered conical shape, and provided with inlets and outlets 2—44, one of which extends to the lowermost region of the conduit. The inlet and outlet pairs may be held in a plate 2—42 suitably secured as by bolts to the upper end of each conduit. Sheet-like fins 2—46 are also provided as extensions of the outer surfaces of the conduits to provide larger heat exchange areas in contact with the ground as well as uniting means for securing together a group of such conduits into a unit.

In the form shown in Fig. 3 the adjacent fins of the respective conduits are united by sheet-like connection plates 2—50 fastened to the fins as by rivets or bolts 2—54. The unitary assembly of conduits can thus be handled and lowered into place in the ground as a single structure. Although the conduits 2—40 are shown as conical, they may also be cylindrical or of square cross section if desired.

*Automatic operation.*—Fig. 5 shows one form of an automatic control arrangement forming part of a heat pump system of the invention of the type described above in connection with Fig. 1. The various operating parts of the heat pump system are arranged to be electrically operated and controlled by electric energy supplied from a conventional electric power source such as domestic alternating current supply including power supply leads 60, 61 of opposite polarity. As shown in Fig. 5, the compressor is driven by an electric motor 12—5, the ground liquid circulating pump 23 is driven by an electric motor 23—5, and the fan 32 of the air conditioner is driven by an electric motor 32—5.

The valves 16, 18, 22, 24, 26 may be of the conventional solenoid type of which various types are available, some with a plurality of solenoids for moving the respective valve into its different valve settings, and others with a solenoid which when actuated will move the valve from a setting to which it is normally biased to an operative setting, the biasing means of the valve returning it to the non-operative setting when the solenoid is de-energizing. In Fig. 5, the selector valve 22 is shown provided with a solenoid operator coil 22—1 which, when energized, brings valve 22 to its heating setting, shown in full lines in Fig. 1, and another solenoid operator coil 22—2 which, when energized, brings the valve 22 to the cooling setting, shown in dash lines in Fig. 1.

Fig. 5 shows the two expansion valves 16, 18, the two by-pass valves 24, 26 provided with solenoid operator coils 16—1, 18—1, 24—1, 26—1, respectively, the energization of which brings the respective valve from the normally biased closed position to the open position.

In the form of the system indicated in Fig. 5, the energizing circuits for the various electrically operated elements of the system are controlled by a main switch 62 shown as a manually operated switch, the closure of which completes the energizing circuit for the fan motor 32—5 of the fan 32 which impels conditioned air over the fins of the conditioning heat exchanger 30.

The fan motor circuit is also shown provided with an automatically operated cut-off switch 63 for automatically deenergizing the fan motor 32—5 in case of an emergency such as improper operation of a critical part of the system. The automatic cut-off switch 63 may be arranged to respond to any faulty condition of the fan or any other part of the system, and for the sake of illustration, the cut-off switch 63 is indicated as operated by the coil connected in the fan motor energizing circuit for opening circuit in case of an excessive current flow into the fan.

Means also are provided to automatically cut off electric power to the other electrically operated parts of the system whenever a critical part of the system, such as the air conditioning fan 32, is rendered inoperative, and to provide for the supply of electric power to the other electrically operated parts of the system only when such critical part of the system proper is in operation.

In Fig. 5 such arrangement is provided by the electrically operated switch 64 which is actuated to close the circuit only if the proper electric power supply is applied to the fan motor 32—5 of the air conditioning fan 32, and for sake of simplicity, the coil of the control switch 64 is shown connected across the terminals of the fan motor 32—5. With this arrangement the switch 64 is actuated to the closed position for completing a circuit connection to an extension 60—1 of the power supply lead 60 only whenever the fan motor 32—5 is properly running.

The other electrical part of the system, to wit, the compressor 12, ground-liquid circulating pump 23, and the several valves 16, 18, 24 and 26 are automatically actuated to their proper operating condition under the control means responsive to the temperature of the space to be conditioned or the like. The temperature response means are shown in the form of a heating thermostat switch 66 and a cooling thermostat switch 67, which may be combined into a single switch unit, for establishing one set of circuit connections in response to temperature conditions requiring heating of the conditioned air and establish another set of circuit connections in response to temperature conditions requiring cooling of the conditioned air.

In the arrangement shown, the heating thermostat 66 may be set to close its switch contacts when the temperature of the air to be conditioned falls below a desired level, and to open its contacts when the temperature of the conditioned air is at the desired level. Similarly, the cooling thermostat 67 may be set to close its contact when the temperature of the conditioned air rises above a desired maximum temperature and to open its contacts when the temperature of the conditioned air has been lowered to the desired level.

Whenever the heating thermostat 66 is closed, for causing the system to heat the conditioned air, the heating thermostat switch completes the following energizing circuits: A direct energizing circuit from the power lead extension 60—1 to the solenoid coil 22—1 of the selector valve 22 for bringing it to the heating setting of valve 22; a similar direct energizing circuit to the solenoid coils 18—1, and 24—1 of the expansion valve 18 and by-pass valve 24 of the refrigerant circulating system for maintaining the circulation of the refrigerant in a heating cycle as described above; and a direct energizing circuit for the actuating winding of a heating relay 71 which completes at its closed contacts an energizing circuit for the compressor motor 12—5 and the ground liquid circulating pump 23—5, thereby setting in operation the heat pump system for operating in a heating setting. The operation of the heat pump system is stopped whenever the conditioned air has been heated to a temperature which causes the heating thermostat 66 to open its contacts.

Whenever the temperature of the space that is to be conditioned rises above the desired maximum temperature, the cooling thermostat 67 is actuated to close its switch contacts in which it establishes the following energizing connections: From the power supply lead extension 60—1 to the solenoid coil 22—2 of the selector valve 22 for bringing it to the dash-line position shown in Fig. 1, in which it is to be maintained in the cooling setting of the system; an energizing circuit to the solenoid coils 16—1, 26—1 of the expansion valve 16 and by-pass valve 26 to establish the refrigerant circulating path required for the cooling setting explained above; and an energizing circuit for the coil of the relay switch 72 for establishing at its closed contact energizing circuits for the compressor motor 12—5 and ground liquid pump motor 23—5 thus causing the system to operate in its cooling setting as described above.

When the operation of the system brings the temperature of the conditioned air to a desired low level, the cooling thermostat 67 automatically opens its switch contacts, thereby automatically stopping the operation of the heat pump system until a rise of the conditioned air above the desired temperature level will cause the cooling thermostat 67 to again bring its switch contacts to the circuit closing position. The control arrangement of the invention includes safety devices such as a thermostat switch 75 adjusted to open the compressor circuit to the compressor motor 12—5 and stop its operation when the temperature of the ground heat exchange fluid falls below a minimum approaching the freezing point, for example, where circulation could not be maintained or at a temperature at which the compressor operation becomes too inefficient. The freeze-preventing thermostat switch may be placed near the coldest part of its recirculation path, as for example, near the outlet of the balancing heat exchanger 20. Additional safety devices are shown as pressure responsive switches 12—1, 12—2 set to selectively open the compressor energizing circuit when its suction pressure gets too low or when its head pressure becomes excessively high respectively. The pressure response switches 12—1, 12—2 may be mounted at the intake and outlet, respectively, of the compressor. The circulating pump 23 may have a set of auxiliary contacts 23—1 which are only kept closed when the circulating pump is properly operating and these contacts 23—1 may also be placed in the compressor energizing circuit to insure that the compressor is operated only when the circulating pump 23 is moving ground heat exchange fluid through the balancing heat exchanger at a suitable rate. Additional overload circuit breakers may be placed in the supply circuits of the circulating pump 23 and compressor 12 to automatically stop operation when these elements are not working properly.

As a further feature of the invention the control arrangement includes biasing control means such as a clock switch 78 to give a desired daily sequence of operation. The clock switch 78 may be set to operate as through an electrically operated relay 79 the control contact 78—1, 78—2 during selected portions of the day. As shown, the relay contacts 78—1 are arranged to open the circuit controlled by the heating thermostat 66, leaving this circuit under the control of secondary heating thermostat 68 which may be set for response at a lower temperature so that less heating is effected during the night and lower temperatures are permitted to prevail.

As shown in Fig. 5, the clock switch 78 may be arranged to close at its additional relay contacts 79—2 an energizing circuit for the motor 23—5 of ground liquid circulating pump 23 even though neither the heating nor cooling thermostats 66, 67 are calling for operation and the compressor is inoperative. By this arrangement the ground heat exchange liquid may be caused to more closely approach the ground temperature during periods of idleness in either the heating or cooling season. This increases the efficiency of the apparatus when it resumes operation.

The invention may also be embodied in modifications other than those described above. For example the expansion valves 16, 18 may be of the fixed type which require no operators. With a corresponding by-pass valve closed the refrigerant must pass through the parallel connected expansion valve and conversely with the by-pass valve open, the flow of refrigerant will be essentially through the relatively unrestricted by-pass and any passage through the shunted expansion valve is of no significance. According to this modification the structure is simplified and the solenoid operators of the expansion valves 16, 18 may be omitted.

According to another phase of the invention the expansion valves and by-pass valves may be replaced by a single two-way expansion valve which functions as a pressure reducer with the refrigerant moving in either direction. This two-way expansion valve may be placed close to both the conditioner 14 and the balancing heat exchanger 20 as by arranging these structures in close proximity. One form of suitable construction for such an expansion valve includes a tapered passageway constricted in its center so that the passageway has a minimum cross section at its center and increases in cross section on each side to provide two expansion horns facing in opposite directions. The above type of expansion valve circuit may be used without shut-off or by-pass valves and the controls for these valves may all be omitted.

The system may also be simplified, if desired, by using a heating-cooling selector valve of the type normally biased to one position, as for example the heating position shown in full lines in Fig. 1, and provided with only a single operator such as solenoid 22—2 to set the valve in cooling position when the cooling thermostat switch 67, is closed. This arrangement dispenses with one of the selector valve operators.

Fig. 5 shows the control system in a non-operating condition, the main switch 62 being open. The automatic controls are placed in operation by merely closing the main switch 62, whereupon the conditioner fan 32 is thereby also actuating switch 64 to connect the power supply lead to its extension 60—1 from which the other electrical operating elements are automatically energized under selective control of the thermostats 66, 67. When the conditioned air temperature falls below the setting of the heating thermostat 66 or 68, heating of the air is automatically effected as explained above. When the conditioned air temperature exceeds the setting of the cooling thermostat 67 the air is automatically cooled. But for the operation of the main "on-off" switch 62 no attention is necessary and the conditioning will be properly controlled as desired, with the thermostats properly set.

The cooling of the conditioned air simultaneously lowers its moisture content if its humidity is high, and water may deposit on the surfaces of the conditioner when so used. Drains may be provided for disposal of this water. During the heating season moisture may be added to the air being circulated as by providing a water tap arranged to bring water to a part of the conditioner where it will evaporate into the circulating air, as by wetting a porous air filter.

The heat pump system of the invention may be used for conditioning air as described above or for performing other desired heating and cooling operations. Thus, for example, the arrangement of the invention may be connected for heating water as needed in homes, offices or factories, etc., while at the same time providing refrigeration for storing foods, cooling drinking water or air. According to one form of such operation, the heat pump system of the invention may be operated in cycles alternating between one stage in which it heats water and another stage in which it cools air. The length of dwell in each stage may be automatically controlled as by providing a time control which automatically alternates the stages in each of which a thermostat type control adjusts the heat pump operation.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In a system for conditioning a medium by selective transfer of heat between the ground and said medium: a liquid circulating system including a liquid confining ground conduit structure imbedded in ground, for effecting a transfer of heat between the ground and the liquid in said conduit structure; a refrigerant circulating system including a conditioning fluid enclosure, an additional fluid enclosure, and a compressor for raising the pressure of a refrigerant fluid drawn in gaseous condition at the compressor inlet and delivered at the compressor outlet and selectively circulating said fluid in series through said two fluid enclosures as a part of a refrigerating cycle; means for maintaining said medium in heat exchange relation with said conditioning enclosure and effecting transfer of heat between the fluid in said conditioning enclosure and air passing it; liquid guide means including liquid circulating means for guiding and circulating a heat exchange liquid in series through said ground conduit structure and in heat exchange relation past said additional fluid enclosure for effecting transfer of heat between the fluid in said additional enclosure and liquid flowing through said conduit structure; and selectively operative means associated with said refrigerant circulating system for selectively causing said conditioning enclosure to operate as a condenser for the refrigerant fluid and said additional enclosure to operate as an evaporator of the refrigerant fluid in one operating condition of the system, and to selectively cause said additional enclosure to operate as a refrigerant condenser and said conditioning enclosure to operate as an evaporator of the refrigerant fluid during another operating condition of the system.

2. In a system for conditioning air in a housing structure by selective transfer of heat between the ground and air admitted to said housing structure: a liquid circulating system including a liquid confining ground conduit structure imbedded in ground, for effecting a transfer of heat between the ground and the liquid in said conduit structure; a refrigerant circulating system including a conditioning fluid enclosure, an additional fluid enclosure, and a compressor for raising the pressure of a refrigerant fluid drawn in gaseous condition at the compressor inlet and delivered at the compressor outlet and selectively circulating said fluid in series through said two fluid enclosures as a part of a refrigerating cycle; air-impelling means for passing air toward said housing structure in heat exchange relation with said conditioning enclosure and effecting transfer of heat between the fluid in said conditioning enclosure and air passing it; liquid guide means including liquid circulating means for guiding and circulating a heat exchange liquid in series through said ground conduit structure and in heat exchange relation past said additional fluid enclosure for effecting transfer of heat between the fluid in said additional enclosure and liquid flowing through said conduit structure; and selectively operative means associated with said refrigerant circulating system for selectively causing the compressed refrigerant fluid delivered from said compressor to either one of said two fluid enclosures to become liquefied therein and to transfer the latent heat of liquification to the medium passing said one fluid enclosure, and to cause the liquefied refrigerant fluid flowing from said one fluid enclosure to the other of said fluid enclosures to evaporate in said other fluid enclosure and absorb latent heat evaporation from the medium passing over said other fluid enclosure.

3. In a system for conditioning a medium by selective transfer of heat between the ground and said medium: a liquid circulating system including a liquid confining ground conduit structure imbedded in ground, for effecting a transfer of heat between the ground and the liquid in said conduit structure; a refrigerant circulating system including a conditioning fluid enclosure, an additional fluid enclosure, and a compressor for raising the pressure of a refrigerant fluid drawn in gaseous condition at the compressor inlet and delivered at the compressor outlet and selectively circulating said fluid in series through said two fluid enclosures as a part of a refrigerating cycle; means for maintaining said medium in heat exchange relation with said conditioning enclosure and effecting transfer of heat between the fluid in said conditioning enclosure and air passing it; liquid guide means including liquid circulating means for guiding and circulating a heat exchange liquid in series through said ground conduit structure and in heat exchange relation past said additional fluid enclosure for effecting transfer of heat between the fluid in said additional enclosure and liquid flowing through said conduit structure; and selectively operative means associated with said refrigerant circulating system for selectively causing the compressed refrigerant fluid delivered from said compressor to either one of said two fluid enclosures to become liquefied therein and to transfer the latent heat of liquification to the medium passing said one fluid enclosure, and to cause the liquefied refrigerant fluid flowing from said one fluid enclosure to the other of said fluid enclosures to evaporate in said other fluid enclosure and absorb latent heat evaporation from the medium passing over said other fluid enclosure.

4. In a conditioning system as claimed in claim 1, in which said ground conduit structure comprises a plurality of metallic pump sections connected in series to form a conduit structure with a large exposed surface having heat exchange contact with the surrounding ground.

5. In a conditioning system as claimed in claim 4, in which the individual metallic conduit sections have an external surface provided with outwardly extending metal sheets which are in heat transfer contact engagement with the surrounding ground.

6. In a conditioning system as claimed in claim 5, in which an array of conduit sections is secured together along some of their extending sheets to form a self-supporting integral multi-conduit section unit for insertion as a unit in the ground.

7. In a conditioning system as claimed in claim 6, in which one of the conduit sections of the multi-conduit section unit has a number of radially extending fins, and the surrounding conduit sections has each a fin secured to different of the fins of said one conduit section.

8. In a conditioning system as claimed in claim 1, in which said system includes means for selectively connecting the fluid entrance end of one of said fluid enclosures either to the compressor inlet or the compressor outlet.

9. In a conditioning system as claimed in claim 1, in which said circulating system comprises an expansion valve for expanding compressed liquefied refrigerant, arranged to be selectively rendered effective or ineffective in the series fluid circuit connection between one of said fluid enclosures and the other of said fluid enclosures.

10. In a conditioning system as claimed in claim 1, in which the series fluid circuit connection between the two fluid enclosures includes an expansion valve for expanding compressed refrigerant flowing from the conditioning enclosure to the additional enclosure, and another expansion valve for expanding compressed fluid flowing from the additional enclosure to the conditioning enclosure, and means selectively rendering ineffective one or the other of said two expansion valves.

11. A conditioning system as claimed in claim 1, in combination with a control arrangement for automatically controlling the operation of said system, said control arrangement including temperature-responsive means for causing said system to operate with said conditioning enclosure as a condenser and said additional enclosure as an evaporator under certain temperature conditions to which said temperature-responsive means is exposed, and to cause said additional enclosure to operate as a condenser and said conditioning enclosure to operate as an evaporator under certain other temperature conditions to which said temperature-responsive means is exposed.

PHILIP SPORN.
EUGENE RUSSELL AMBROSE.

REFERENCES CITED

The following references are of record in the file of this patent:

UNITED STATES PATENTS

| Number | Name | Date |
|---|---|---|
| 1,917,154 | Porter | July 4, 1933 |
| 2,071,178 | Roessler | Feb. 16, 1937 |
| 2,105,383 | White | Jan. 11, 1939 |
| 2,428,876 | Hawkins | Oct. 14, 1947 |